United States Patent [19]
Cohen

[11] 3,844,718
[45] Oct. 29, 1974

[54] FROZEN FOOD DEFROSTING INDICATOR

[76] Inventor: Herman Cohen, Kennebunk, Maine 04043

[22] Filed: May 1, 1972

[21] Appl. No.: 249,019

[52] U.S. Cl. ............ 23/253 TP, 116/114, 426/88
[51] Int. Cl. .......................................... G01n 31/22
[58] Field of Search ............ 23/253 TP; 99/192 TI; 73/356; 116/114 V; 426/87, 88

[56] References Cited
UNITED STATES PATENTS
2,379,459   7/1945   Schreiber et al. ............... 23/253 TP
2,617,734   11/1952  Chapple .......................... 99/192 TI
2,852,394   9/1958   Fahringer ........................ 99/192 TI

*Primary Examiner*—Robert M. Reese
*Attorney, Agent, or Firm*—Cushman, Darby & Cushman

[57] ABSTRACT

A waterproof transparent capsule containing an indicator including indicia printed in water-soluble ink on a hygroscopic substance is secured to the frozen food shipment to be monitored and the indicator placed in communication with the shipment. If the shipment defrosts, the indicator admits water or water vapor from the shipment, irreversibly affecting the appearance of the water-soluble indicia.

6 Claims, 3 Drawing Figures

PATENTED OCT 29 1974    3,844,718

FROZEN FOOD DEFROSTING INDICATOR

BACKGROUND OF THE INVENTION

Between the time when frozen food is packed and frozen and when it reaches the ultimate retail outlet or consumer, there are opportunities for defrosting the food, to the detriment of its quality and wholesomeness, even if the defrosted food is subsequently refrozen. For instance, the refrigeration units on trucks and railroad cars and in warehouses occasionally fail or are inadvertently switched off. Pallets of partial carload lots can be off-loaded onto unrefrigerated docks pending transfer to other transportation means and defrost while waiting.

Upstream of the ultimate consumer, there are factors speaking both for and against inclusion of defrosting indicators on frozen food packages. On one hand, processors, shippers and vendors, whose good will is connected with the quality of the frozen foods, want to maintain and enhance that good will by avoiding transferring a spoiled product to a customer, but on the other hand, businessmen wish to avoid placing themselves in a position where they may be forced to liquidate an unsaleable, non-returnable inventory. However, a properly used indicator system can be checked at each transfer and not accepted when appropriate, to fix responsibility; and the fact that such indicators can prevent illness when heeded speaks strongly for their widespread usage.

SUMMARY OF THE INVENTION

Indicating indicia are printed on a strip of hygroscopic substance, such as unsized paper (e.g., pretreated with calcium chloride to enhance its hygroscopic property). The indicator strip is encapsulated, e.g., between two plastic sheets, sealed at the perimeters. At least the outer sheet is transparent, and the inner sheet is perforated. The frozen food package to be monitored is also perforated and the perforations of the indicator capsule juxtaposed with the package perforations to place the frozen food package contents in vapor communication with the indicator strip. Thus, if the contents defrost unfrozen water, i.e., liquid water or, water vapor given off thereby will soak into the indicator strip actuating the indicia. The indicia may be in the form of a word which blots to illegibility when actuated. In that instance, the indicator capsule may be fastened on the frozen food package within a warning printed on the package, in which the warning reads innocuously so long as the indicator strip indicia remains legible, but which reads alarmingly when the indicia is obliterated.

The principles of the invention will be further hereinafter discussed with reference to the drawing wherein preferred embodiments are shown. The specifics illustrated in the drawing are intended to exemplify, rather than limit, aspects of the invention as defined in the claims.

DETAILED DISCUSSION OF THE PRESENTLY PREFERRED EMBODIMENTS OF THE INVENTION

Figure 1:
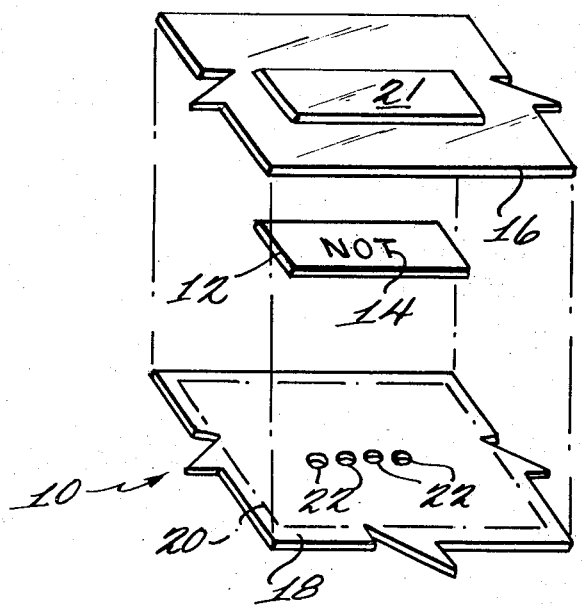
FIG. 1 is an exploded perspective view of the encapsulated indicator strip.

The encapsulated indicator 10 includes a strip 12 of hygroscopic material such as unsized paper, which may be treated with known hygroscopic substances such as calcium chloride to enhance this property thereof. The strip 12 is printed with indicia, such as the word "NOT" 14, using water-soluble ink. The strip 12 is encapsulated between an unperforated, water-tight, transparent outer sheet 16 and a vapor-permeable inner sheet 18, which are secured at 20 about their peripheries. In the example depicted, the central region of the sheet 16 is impressed to create a cup-shaped receiver 21 for the strip 12, and the sheet 18 is caused to be vapor-permeable by forming perforations 22 therethrough.

Figure 2:
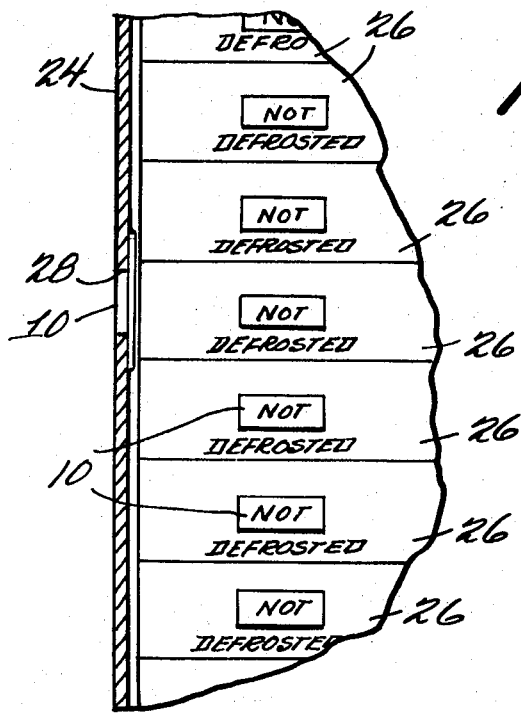
FIG. 2 shows in a transverse sectional view of a carton of frozen food packages two uses of the indicator on frozen food.

Referring to FIG. 2, the encapsulated indicator strip 10 may be mounted in the wall of a carton 24 in which a plurality of packages 26 of frozen food are being shipped, thus permitting the whole carton to be monitored as it travels from the packager to the retail store. Likewise, other indicator strips 10 may be mounted in the respective walls of the individual frozen food packages, to permit the ultimate consumer to discriminate between wholesome and questionable, refrozen frozen food packages at the market and when preparing meals.

Preferably, the encapsulated indicator strips are mounted behind suitably shaped openings 28 in the packages and cartons so the cup-shaped receiver 21 protrudes no further than flushness with the outside of the packages and cartons. However, in other instances, the sheet 18 may be constituted by the wall of the carton or package.

Figure 3:
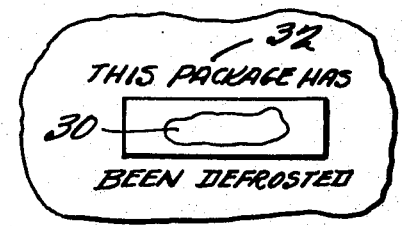
FIG. 3 shows a typical indication of defrosted frozen food, provided through use of the principles and means of the invention.

In FIG. 1, the indicator strip is shown printed with the word NOT. In FIG. 3, the indicator is shown in typical juxtaposition on a package or carton following defrosting. Note that the word NOT has blotted at 30, turning the message 32 from an innocuous reassurance to an alarming warning. In other words, the package 26 initially has a negated warning 32, prior to the time when the word NOT soaks up water from the defrosting frozen food and blots, at 30.

It should now be apparent that the frozen food defrosting indicator as described hereinabove possesses each of the attributes set forth in the specification under the heading "Summary of the Invention" hereinbefore. Because the frozen food defrosting indicator of the invention can be modified to some extent without departing from the principles of the invention as they have been outlined and explained in this specification, the present invention should be understood as encompassing all such modifications as are within the spirit and scope of the following claims.

What is claimed is:

1. A defrosting indicator for frozen food packages comprising:

a strip of hygroscopic material having indicia printed thereon in water-soluble medium, said strip having an outer side and an opposing, under side;

a transparent, water-tight outer cover for the outer side of said strip, through which said indicia may be viewed;

a water vapor-permeable under-cover for the under side of said strip through which said strip may be placed in vapor communication with frozen food to be monitored for thawing; and means securing the two covers together perimetrically of the strip.

2. The indicator of claim 1 wherein the strip is made of unsized paper printed with water-soluble ink.

3. The indicator of claim 1 incorporated in a wall of an individual package of frozen food.

4. The indicator of claim 3 wherein the package has a warning of defrosted condition printed thereon adjacent the strip and the indicia, prior to soaking up water from the frozen food, is constituted by a negation of the warning.

5. The indicator of claim 1 incorporated in a wall of a shipping carton for a multiplicity of individual frozen food packages.

6. A defrosting indicator for frozen food packages comprising:

strip means comprising hygroscopic material having visible indicia printed thereon of water-soluble medium; which indicia modify in appearance when in contact with unfrozen water said strip having an outer side and an opposing under side;

a water tight outer cover for the outer side of said strip means through which said indicia may be viewed;

a water permeable under-cover for the under side of said strip means through which said strip may be placed in communication with frozen foods to be monitored for thawing; and sealing means about the indicator ensuring that if the indicia becomes modified in appearance, it is because unfrozen water has contacted the strip means via the water permeable under-cover.

* * * * *